W. F. MORSE.
FRUIT PITTING MACHINE.
APPLICATION FILED FEB. 14, 1913.
1,244,757.
Patented Oct. 30, 1917.
9 SHEETS—SHEET 1.
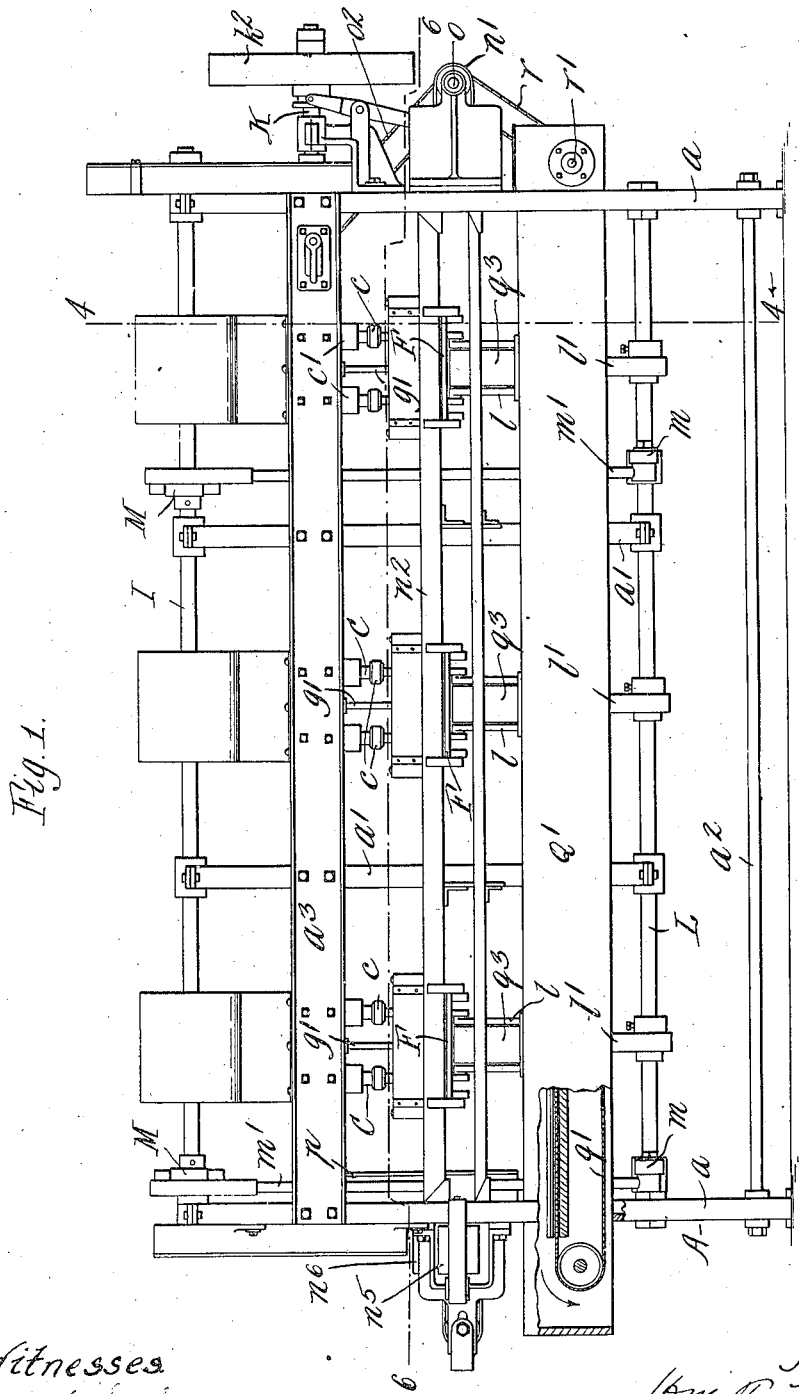

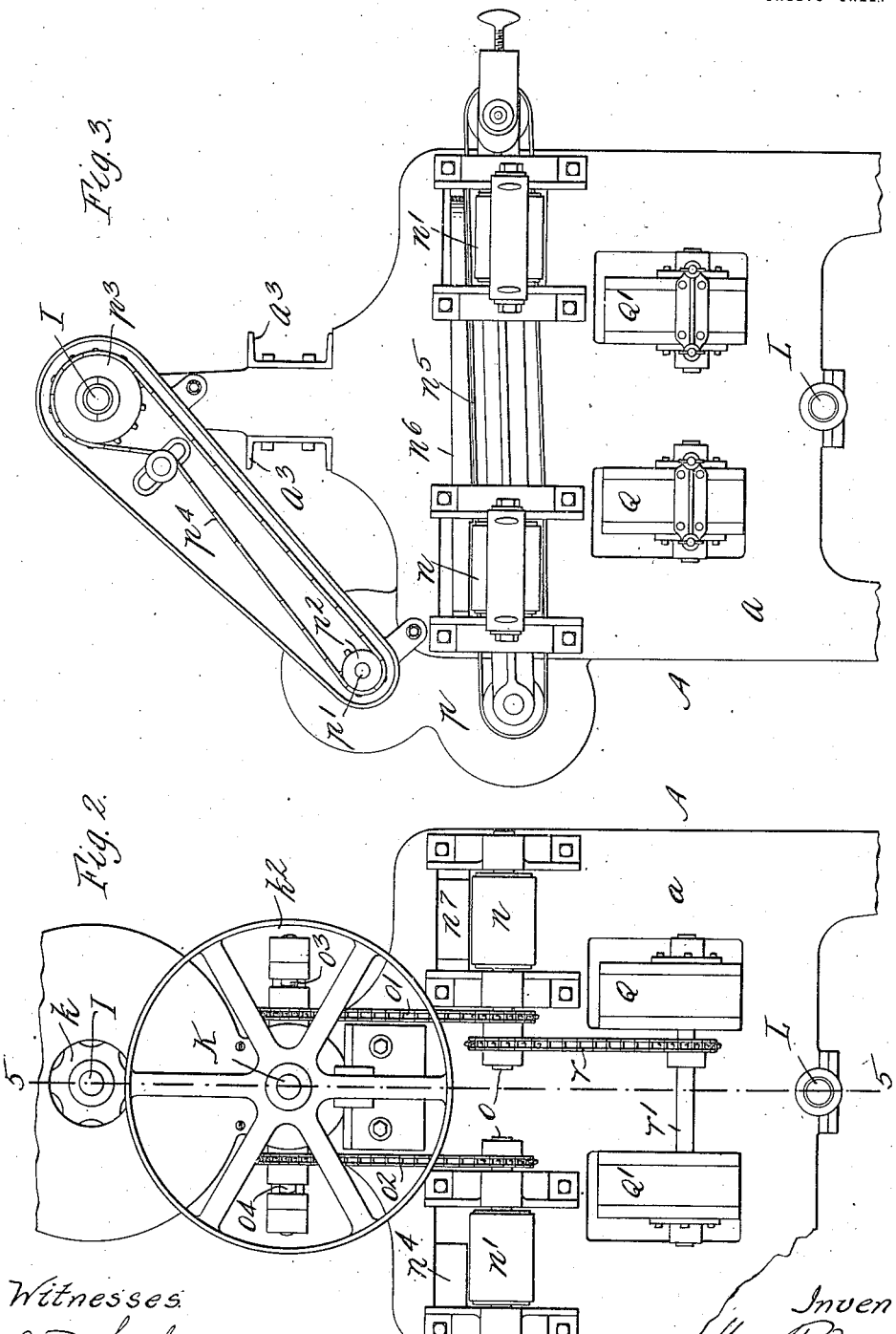

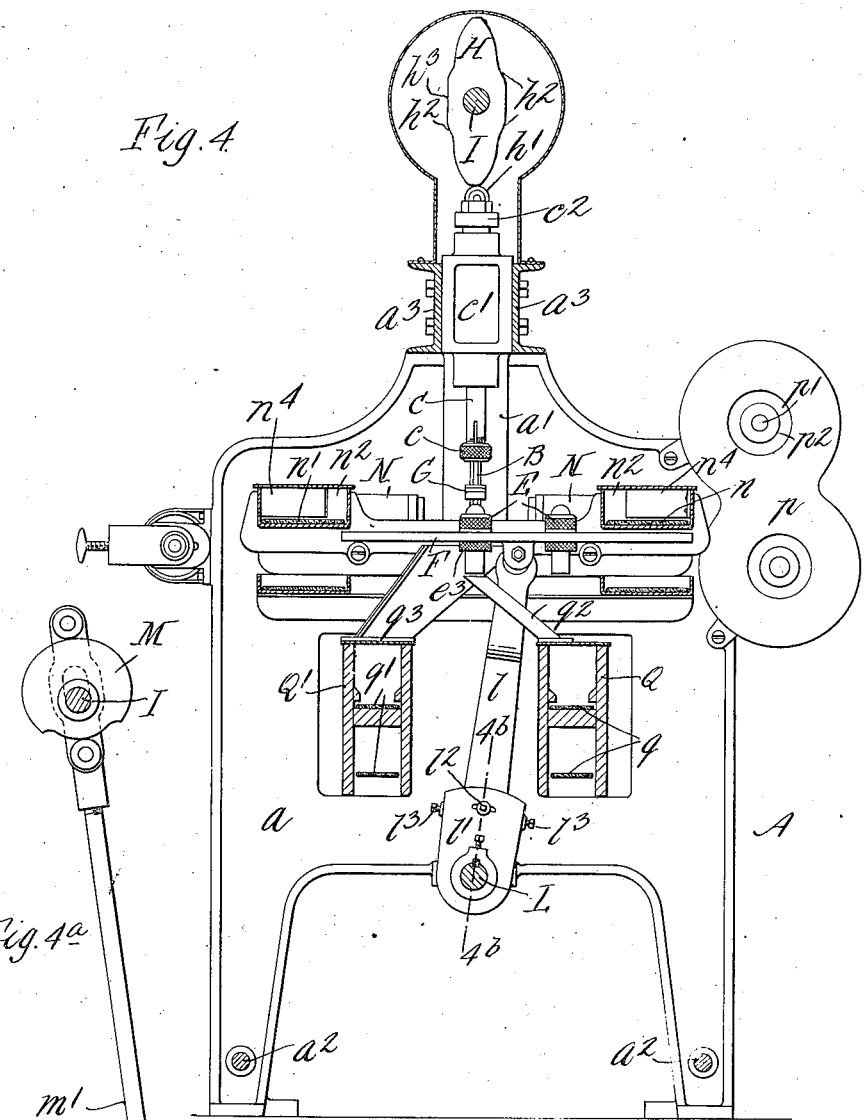

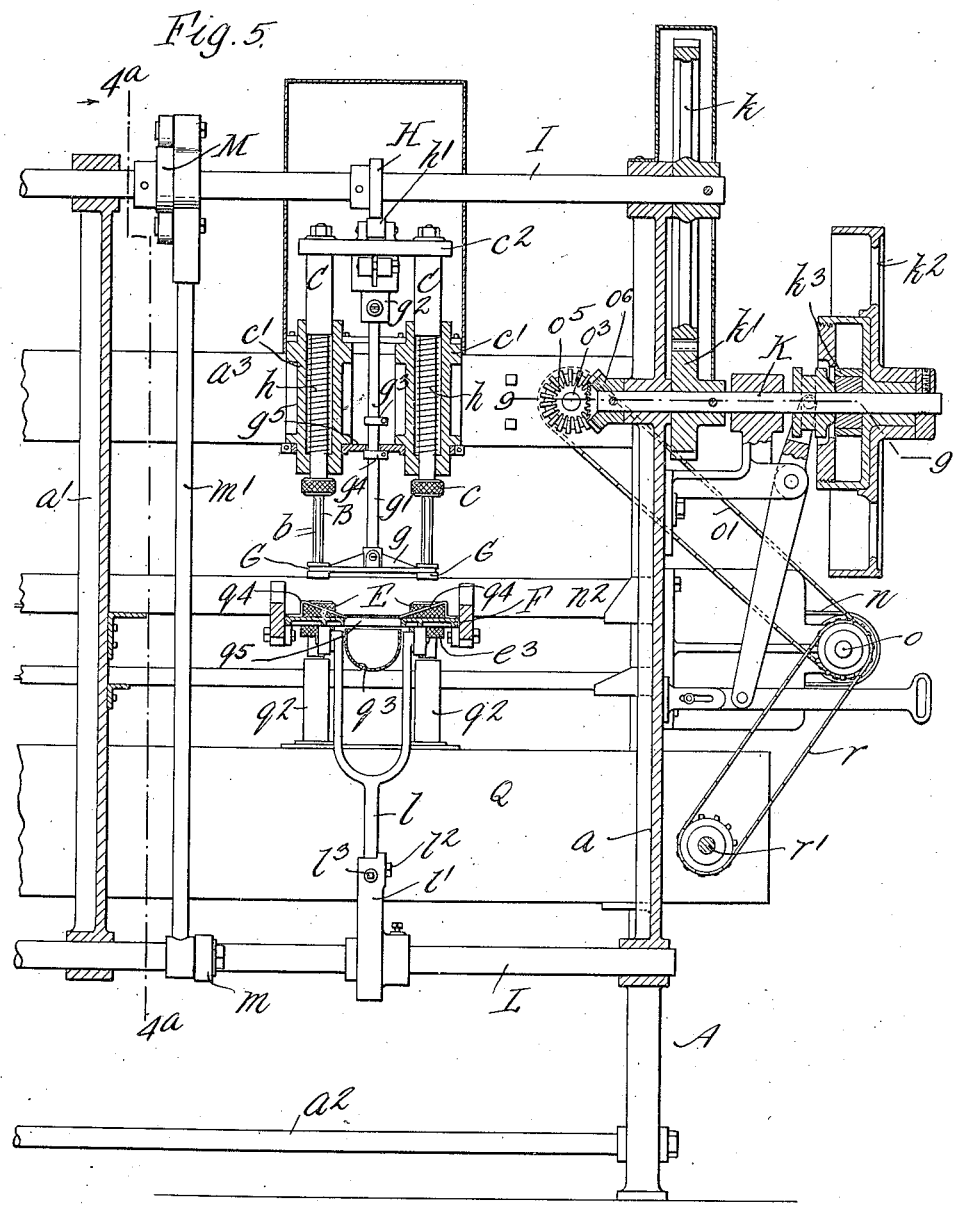

W. F. MORSE.
FRUIT PITTING MACHINE.
APPLICATION FILED FEB. 14, 1913.
1,244,757.
Patented Oct. 30, 1917.
9 SHEETS—SHEET 5.
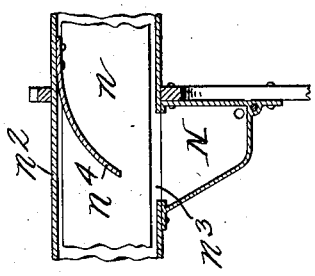
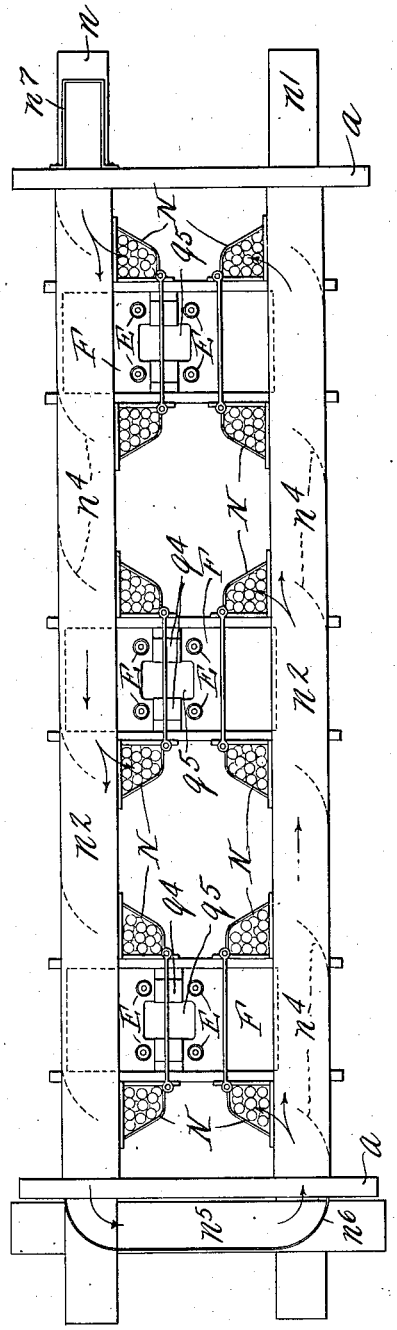
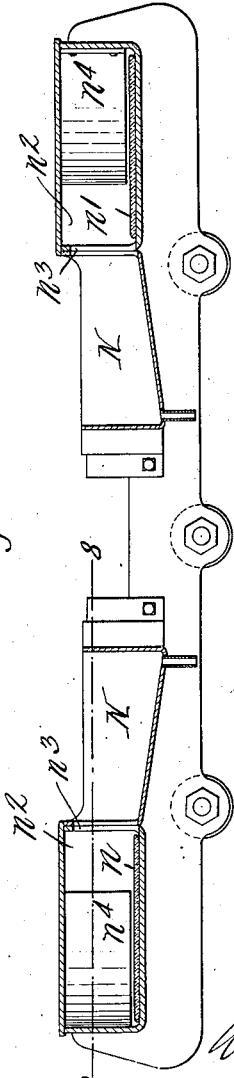
Witnesses
Inventor
Attorneys.

W. F. MORSE.
FRUIT PITTING MACHINE.
APPLICATION FILED FEB. 14, 1913.
1,244,757.
Patented Oct. 30, 1917.
9 SHEETS—SHEET 6.
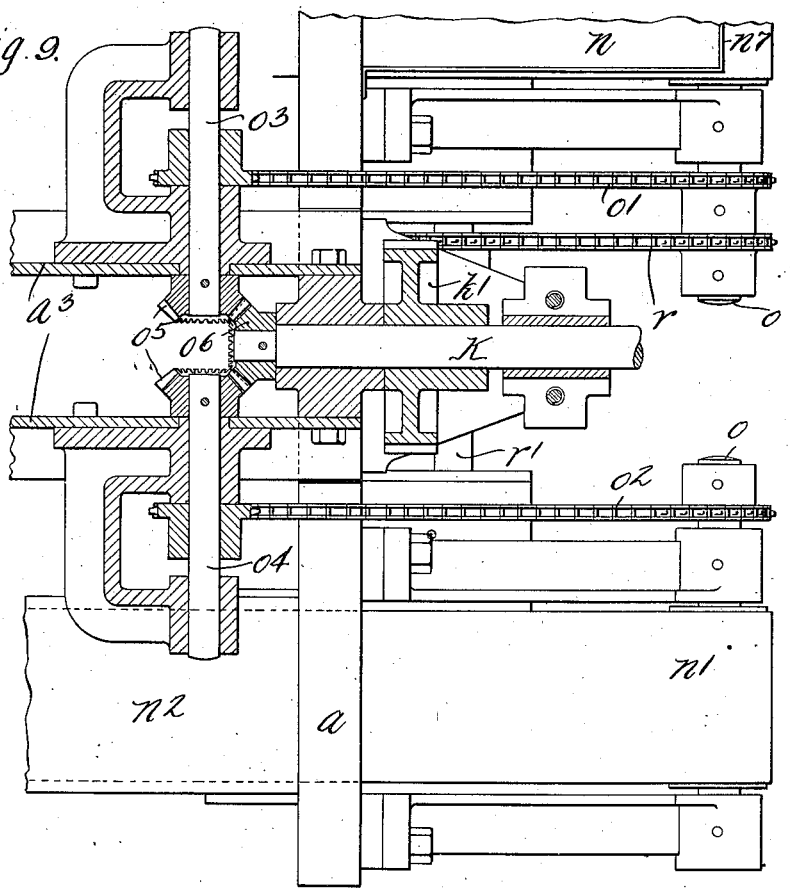
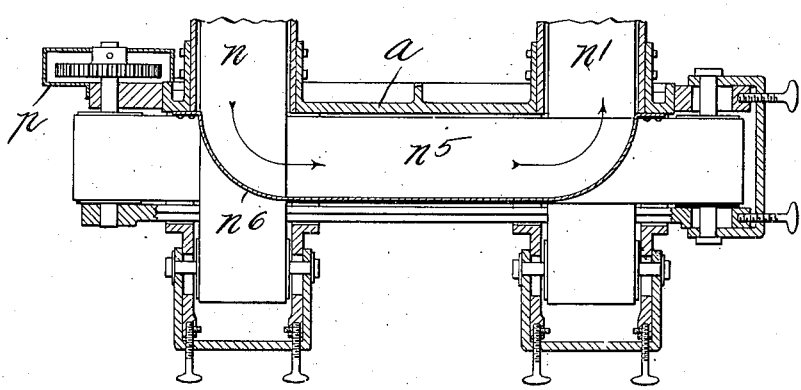

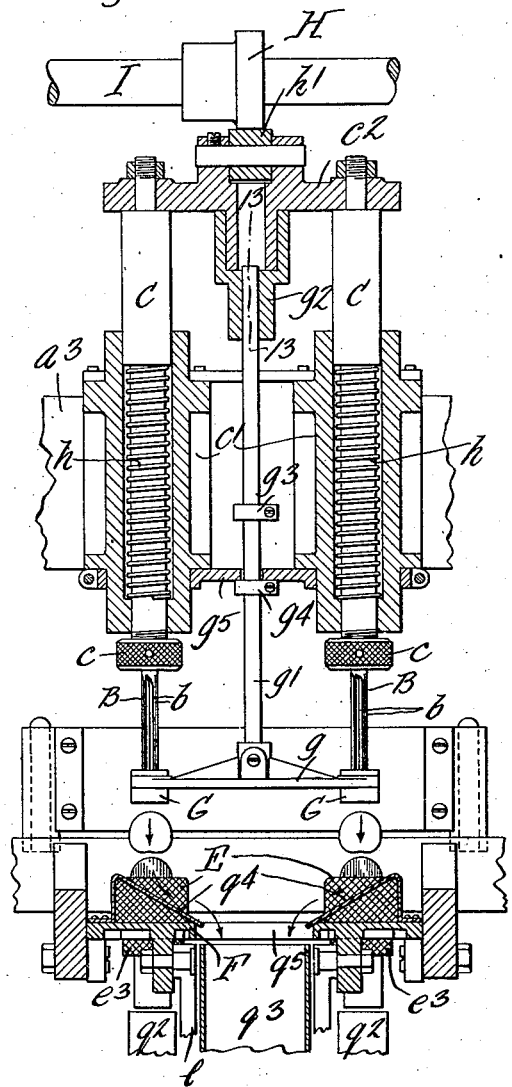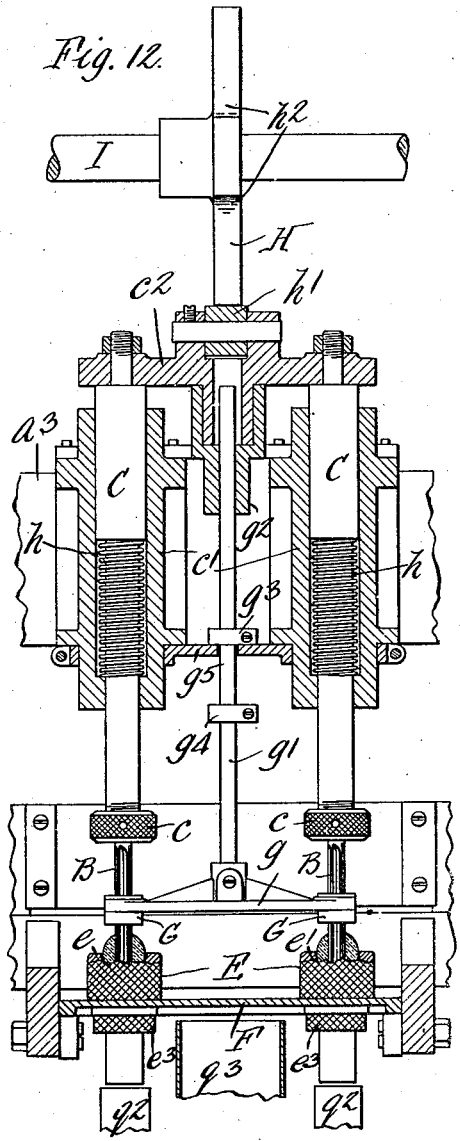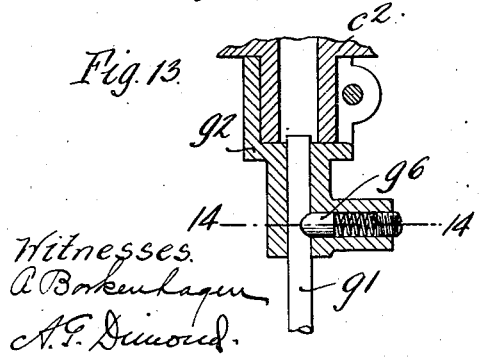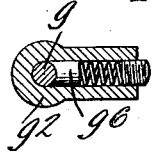

W. F. MORSE.
FRUIT PITTING MACHINE.
APPLICATION FILED FEB. 14, 1913.
1,244,757.
Patented Oct. 30, 1917.
9 SHEETS—SHEET 8.
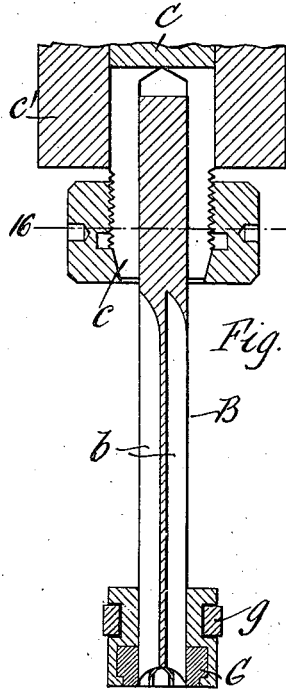
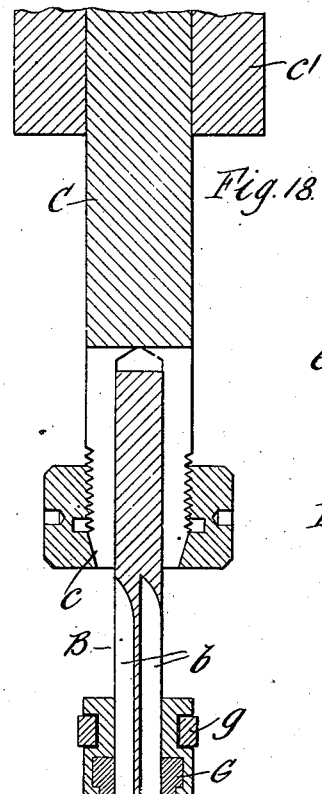
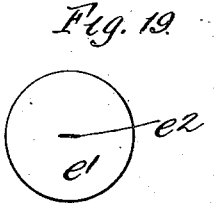
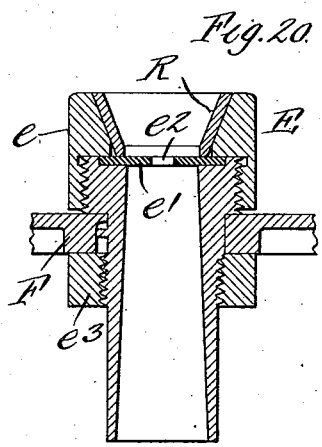
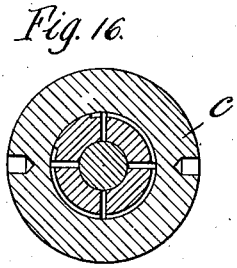
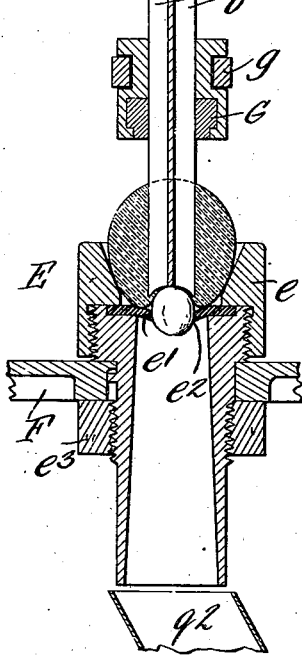
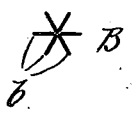
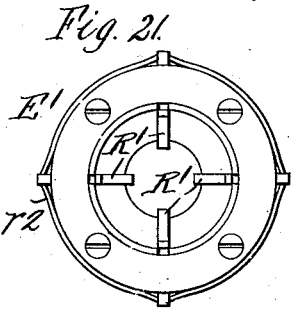
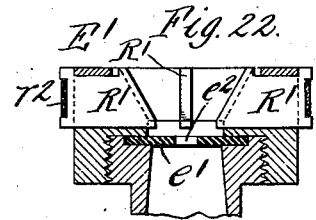

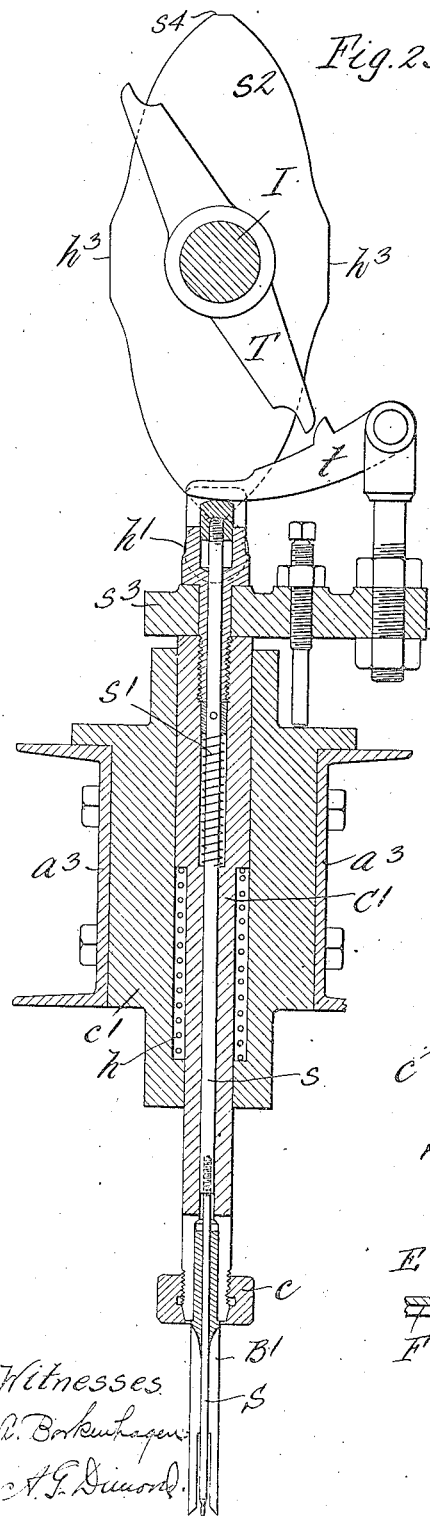
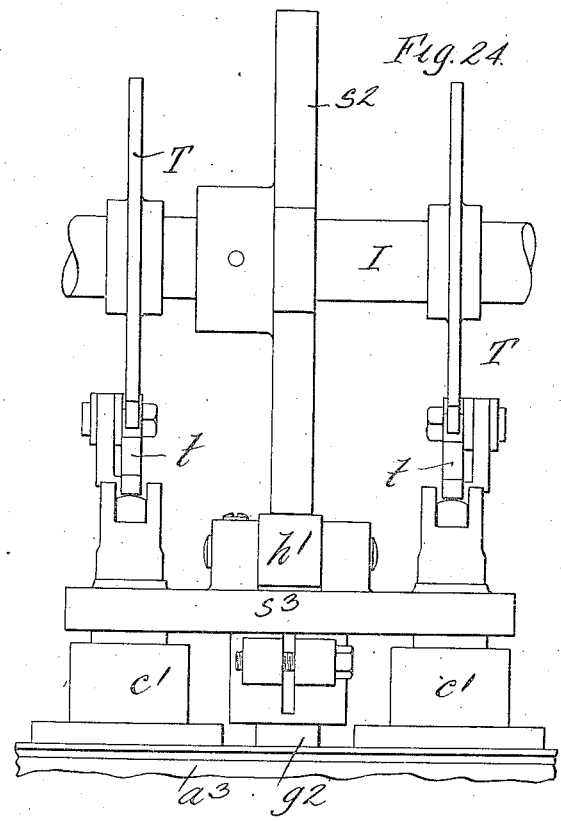
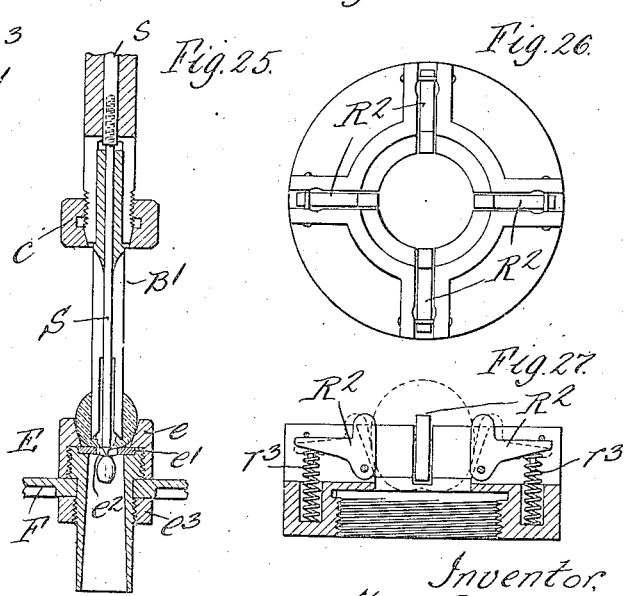

UNITED STATES PATENT OFFICE.

WILLIAM F. MORSE, OF ROCHESTER, NEW YORK, ASSIGNOR TO HUNTLEY MANUFACTURING COMPANY, OF SILVER CREEK, NEW YORK.

FRUIT-PITTING MACHINE.

1,244,757. Specification of Letters Patent. Patented Oct. 30, 1917.

Application filed February 14, 1913. Serial No. 748,357.

*To all whom it may concern:*

Be it known that I, WILLIAM F. MORSE, a citizen of the United States, residing at Rochester, in the county of Monroe and State of New York, have invented a new and useful Improvement in Fruit-Pitting Machines, of which the following is a specification.

This invention relates to fruit pitting machines, and more particularly to a machine for removing the pits from selected or fancy cherries, such as Maraschino cherries, which are ordinarily pitted by hand in order to avoid as far as possible the deformation or injuring of the fruit.

The objects of this invention are to produce a machine adapted to perform the work ordinarily done by hand and which will be rapid and efficient in operation and will remove the pits with the minimum waste and injury to the fruit; also to provide a machine in which the fruit is placed by hand in holders by which it is carried to the pitting punches, the holders being arranged and operated in pairs in such a manner that while the fruit in one or more holders is being pitted, other holders are exposed at one or the other side of the punches in position for the fruit to be placed therein alternately by operatives stationed at opposite sides of the machine thus greatly increasing rapidity of operation and the output of the machine; also to provide in connection with the reciprocating pitting punch, an elastic stripper through which the pit is forced and which acts to hold the fruit intact and retain its original form and also to completely scrape or strip the meat from the pit so as to prevent waste of the meat.

In the accompanying drawings, consisting of nine sheets:

Figure 1 is a side elevation, partly in section, of a fruit pitting machine embodying the invention.

Fig. 2 is a fragmentary elevation of one end thereof.

Fig. 3 is a fragmentary elevation of the opposite end thereof.

Fig. 4 is a transverse sectional elevation of the machine, on an enlarged scale, on line 4—4, Fig. 1.

Fig. 4ª is a sectional elevation on line 4ª—4ª, Fig. 5.

Fig. 4ᵇ is a section, on an enlarged scale, on line 4ᵇ—4ᵇ, Fig. 4.

Fig. 5 is a fragmentary longitudinal sectional elevation on line 5—5, Fig. 2.

Fig. 6 is a fragmentary plan view thereof, partly in section on line 6—6, Fig. 1.

Fig. 7 is an enlarged transverse sectional elevation of the fruit conveyers.

Fig. 8 is a fragmentary horizontal section thereof, on line 8—8, Fig. 7, on a reduced scale.

Fig. 9 is a horizontal section, partly in plan, on an enlarged scale on line 9—9, Fig. 5.

Fig. 10 is a plan view, partly in section, showing the arrangement of the conveyers at one end of the machine.

Fig. 11 is an enlarged sectional elevation of one pair of the pitting plungers and the associated parts.

Fig. 12 is a similar view showing a different position of the parts.

Fig. 13 is an enlarged sectional elevation in line 13—13, Fig. 11.

Fig. 14 is a horizontal section on line 14—14, Fig. 13.

Fig. 15 is an enlarged sectional elevation of one of the pitting plungers and the cherry stripper.

Fig. 16 is a horizontal section on line 16—16, Fig. 15, of the holding clutch for the pitting plunger.

Fig. 17 is a cross section of the pitting punch.

Fig. 18 is an enlarged sectional elevation of one of the pitting punches and the coöperating cherry holder.

Fig. 19 is a plan view of the elastic stripping disk.

Fig. 20 is an enlarged sectional elevation of one of the holders provided with an adapter for small cherries.

Fig. 21 is a plan view of a cherry holder of modified construction.

Fig. 22 is a fragmentary sectional elevation thereof.

Fig. 23 is a sectional elevation of a pitting punch of modified construction and the actuating means therefor.

Fig. 24 is a fragmentary side elevation of a pair of the pitting punches of the kind shown in Fig. 23 and the actuating means therefor.

Fig. 25 is a fragmentary sectional elevation of one of the pitting punches shown in Fig. 23 and the coöperating cherry holder.

Fig. 26 is a plan view of a fruit holder of still another construction.

Fig. 27 is a sectional elevation thereof.

Like reference characters refer to like parts in the several figures.

A represents the stationary frame of the machine which may be of any suitable construction, the frame shown in the drawings consisting of end and intermediate upright pieces $a\ a'$ connected at their lower portions by horizontal rods $a^2$ and at their upper portions by horizontal beams or bars $a^3$.

B represents pitting punches which are arranged vertically substantially midway between the opposite sides of the machine, and are secured, for instance, by chucks $c$ to the lower ends of vertically reciprocating plungers or holders C. The punches are grooved lengthwise to form the usual thin radial wings or blades $b$ and have cupped or socketed lower ends, as shown in Figs. 15 and 18, so that they are adapted to pierce the cherries, without punching large holes therein, and shove the pits out of the fruit through stripping devices located below the punches. The punches are preferably arranged in pairs at suitable distances apart for operatives to be stationed along opposite sides of the machine, one opposite each pair of punches. Any number of pairs (one or more) of punches can be employed, depending upon the desired capacity of the machine. The machine illustrated has three pairs of punches, and the plungers for each pair of punches are arranged to slide in vertical guides or bearings $c'$ secured between the frame bars $a^3$ and are connected at their upper ends by a cross head $c^2$ which causes the two plungers to reciprocate in unison.

A pair of cherry holders E, each adapted to hold one cherry, is provided for each pitting punch, the holders being arranged to reciprocate simultaneously transversely of the machine to place the holders alternately in operative position beneath the punch. The holders are reciprocated in such a manner that while the punch is pitting the cherry in one holder which is held stationary beneath it, the operative at one side of the machine places a cherry in the other holder, which is then exposed at that side of the machine. The holders are then moved in one direction to place the second holder with its cherry beneath the punch, and while this cherry is being pitted the operative at the other side of the machine places another cherry in the first holder, after which the holders are moved in the opposite direction to again place the first holder with its cherry in position beneath the punch.

The two pairs of holders E for each pair of punches are preferably mounted on a common reciprocating carriage or slide F so that each group of four holders moves as a unit. By this arrangement the cherries are fed to each pair of punches alternately by two operatives, and each operative picks up a cherry in each hand and places the two cherries simultaneously in two of the holders while the cherries in the other two holders are being pitted. As the cherries are thus fed to the punches two at a time, alternately by different operatives, the machine can be operated rapidly and has a large output, and yet each operative has ample time to pick up and place the cherries in proper position in the holders.

Each holder E is provided with an open bottomed socket or seat $e$ in which the cherry is adapted to rest with its stem end downward, and below this seat, with a stripping disk or plate $e'$ of rubber or analogous elastic material which has a small central slit $e^2$, Fig. 19, through which the cherry pit is adapted to be forced by the punch. In the construction shown in Figs. 18 and 20, the holders consists of head and shank portions screwed together and between which the stripping disk is held. The holder is secured in a hole in the slide or carriage F by a nut $e^3$ screwed on a threaded portion of the holder shank. The cherry rests in the holder with its stem end bearing against or very close to the stripping disk. The pitting punch descends through the cherry far enough to engage and force the pit downwardly through the slit in the elastic stripping plate, but the punch does not pass through the stripping plate. The slit in the elastic stripping plate is stretched by the pit passing through it and closely hugs the pit so as to strip or scrape the pit clean and prevent any meat from being torn away from the fruit by the pit. As the punch does not pass through the stripping plate, the latter does not have to be provided with radial slits or openings for the passage of the radial wings of the punch and therefore hugs the pit much more tightly and strips it much cleaner than a stripper of the sort heretofore used, having radial slits for the passage of the wings of the punch. The stripping plate, furthermore, is not cut or injured by the punch and its life is, therefore, lengthened.

When the pits have been shoved through the stripping plates by the punches, they fall through the tubular shanks of the holders E and are discharged from the machine, as hereinafter explained. When the punches rise after forcing the pits out of the cherries, the cherries cling to the punches and are thereby lifted out of the holders E, the cherries being removed from the punches by strippers or ejectors G, which are slidable lengthwise on the punches and have holes conforming to the winged shape of the punches. These strippers are conveniently formed by soft metal cores cast around the punches in hollow shells, as in this way the strippers fit the punches closely and strip the fruit cleanly therefrom, and the strippers can be easily formed. The strippers or ejectors G for the punches of each pair are preferably secured to a plate or carrier $g$ provided with a rod $g'$ which is held by friction in a socket $g^2$ secured to the plunger cross head $c^2$ so that the strippers G reciprocate with the punches until they are arrested by the engagement of stops or collars $g^3$ $g^4$ on the rod $g'$ with a bar $g^5$ or other suitable stationary part of the machine. A spring-pressed friction block $g^6$ confined in a hole in the socket $g^2$ and bearing against the rod $g'$ (see Figs. 13 and 14) is shown for causing the strippers to reciprocate with the punches. The strippers thus descend with the punches until arrested by the upper stop $g^3$ striking the bar $g^5$, while the punches continue their descent and impale the cherries. When the punches rise and lift the cherries out of the holders E, the strippers move with the punches until arrested by the engagement of the lower stop $g^4$ with the cross bar $g^5$. During the further upward movement of the punches they slide through the strippers, thus stripping the pitted cherries off of the punches. Before the cherries are thus disengaged from the punches, the holders E are moved from beneath the punches, so that when the cherries are disengaged from the punches they will not fall back into the holders but will fall through an opening $q^5$ in the carriage F and be discharged from the machine by suitable means, as hereinafter explained.

The pitting punches can be reciprocated vertically and the cherry holders reciprocated beneath the punches in the manner explained, by any suitable mechanisms.

In the construction shown in the drawings, each pair of plungers C is raised by springs $h$ surrounding the plungers in the plunger guides, and is lowered by a cam H which engages an anti-friction roller $h'$ journaled on the cross head $c^2$ connecting the plungers. The cam, as shown in Fig. 4, is provided with portions at opposite sides of the shaft for causing the punches to be raised and lowered twice during each revolution of the shaft, and the cam is provided with dwells $h^2$ whereby the punches are held stationary for an instant before they reach the limit of their upward movement. While the punches are thus held stationary, the holders from which the cherries have been lifted by the punches are moved from beneath the punches as before explained, and when the upward motion of the punches is continued, which is permitted by the flattened interruptions $h^3$, the cherries are quickly stripped or disengaged from the punches. The strippers thus act positively and at the proper time, to disengage the cherries from the punches, and the cherries are thereby prevented from falling back into the holders before the holders have been moved from beneath the punches. The cams H for the several pairs of punches are secured on a horizontal shaft I, which extends lengthwise of the machine at the upper portion thereof and is suitably journaled on the end and intermediate upright portions $a$ $a'$ of the frame. The cam shaft I may be driven by any suitable means, for instance, it is connected by gear wheels $k$ $k'$ to a drive shaft K which is journaled in suitable bearings on the frame at one end of the machine and is provided with a drive pulley $k^2$ and with a clutch $k^3$ for starting and stopping the machine.

The mechanism shown for reciprocating the cherry holders beneath the punches is constructed as follows:

A horizontal rock shaft L extending lengthwise of the machine at the lower portion thereof, is provided with a rock arm $l$ for actuating the slide or carriage F for each group of cherry holders E. The rock arm $l$, see Figs. 4 and 5, has a forked upper end, the branches of which are suitably connected to the carriage F at opposite sides of the opening $q^5$ therein. In order to adjust the rock arm $l$ so as to insure the holders being placed accurately in registration with the pitting punches, the rock arm $l$ is preferably sleeved loosely on the shaft L beside a hub $l'$ which is fixed in any suitable way to the shaft. The arm $l$ is adjustably secured to the hub $l'$ by a screw $l^2$ passing through a slot in the hub, and set screws $l^3$ carried by the hub at opposite sides of the rock arm $l$. By loosening the screw $l^2$ and properly adjusting the set screws $l^3$ the rock arm $l$ can be adjusted radially on the rock shaft as may be required and then securely fastened by tightening the screw $l^2$. The shaft L is rocked by an arm $m$ fixed thereon and connected to the lower end of a rod $m'$ which is provided at its upper end with a loop or slotted guide portion through which the shaft I passes, and with rollers adapted to be engaged by a cam M on the shaft I for reciprocating the rod $m'$. The rod $m'$ is adjustably connected by a pin and slot, or otherwise, to the arm $m$ to permit the length of the stroke of the cherry holders to be adjusted as required. This cam may be of any suitable form adapted to reciprocate the cherry holders in the manner above stated, that is, so that first one holder is placed beneath the punch and held stationary while the cherry therein is being pitted, and the second holder is then placed beneath the punch and held stationary until the cherry therein is pitted. The cams M are so timed with reference to the cams H that the cherry holders do not commence to move until the punches have been raised high enough to clear the holders.

N, Figs. 6, 7 and 8, represents fruit receptacles or corrals located along opposite sides of the machine, preferably at the right and left hand sides of each set of pitting devices so that each operative can readily use both hands to pick up two cherries simultaneously. The cherries are preferably fed to these corrals by belts or conveyers $n$ $n'$, which are arranged along opposite sides of the machine, with the upper run of each belt traveling in a covered trough or box $n^2$ which communicates by openings $n^3$ in its inner side with the several corrals at one side of the machine. Deflectors $n^4$ are provided in each trough opposite the openings $n^3$ and above the belt, so that as the cherries are carried along by the belt the deflectors shove them off of the belt through the openings $n^3$ into the corrals N. In the arrangement shown in the drawings, the belts travel in opposite directions and a cross belt $n^5$ is arranged at one end of the machine beneath a guard $n^6$. A feed hopper or chute $n^7$ is provided, at the opposite end of the machine over the belt $n$, in which the cherries are placed and from which they are carried by the belt $n$. The cherries are shoved off of the belt $n$ by the deflectors $n^4$ into the corrals N along the adjacent side of the machine, and when these corrals are filled, the cherries are carried past them to the cross belt $n^5$ and are delivered thereby to the other longitudinal belt $n'$, which successively fills the corrals at the other side of the machine in a similar manner. The cherries are thus fed more or less continuously to the corrals and keep them substantially filled. The feed belts can be driven by any suitable mechanism. As shown in the drawings, see Figs. 2, 5 and 9, the pulley shafts $o$, at one end of the machine, for the belts $n$ $n'$ are connected by chain wheels and chains $o'$ $o^2$ to two shafts $o^3$ $o^4$ which are arranged at opposite sides of the drive shaft K and are connected by bevel gears $o^5$ to a bevel gear $o^6$ on the inner end of the drive shaft. The belts $n$ $n'$ are thus driven in opposite directions. The cross belt $n^5$ is driven by gears inclosed in a housing $p$ and connecting one of the pulley shafts for this belt with a shaft $p'$, Fig. 3, which is connected by chain wheels $p^2$ $p^3$ and a chain $p^4$ with the cam shaft I.

Q Q' represent conveyer troughs extending lengthwise of the machine below the feed conveyers and in which travel conveyers or belts $q$ $q'$ for discharging the pitted cherries and the cherry pits. Open-ended chutes $q^2$, Figs. 4 and 5, extend upwardly from the trough Q to points beneath the pitting punches. The cherry holders E are positioned over the upper ends of these chutes at the times that the cherries are being pitted and the pits fall from the holders E into the chutes $q^2$ and are thereby delivered to the conveyer $q$, by which they are discharged at one end of the machine. Open-ended chutes $q^3$, Figs. 1, 4 and 5, extend upwardly from the conveyer trough Q' to points beneath the reciprocating carriages F for the cherry holders E. When the cherries drop from the raised pitting punches, as before explained, they fall on inclined plates $q^4$, Fig. 11, on the carriages F between the holders E, and are thereby directed through the openings $q^5$ in the carriages into the chutes $q^3$ through which they pass to the conveyer $q'$. This conveyer discharges the pitted cherries at one end of the machine.

The discharge conveyers are driven by a chain $r$, Fig. 5, which connects a chain wheel on the pulley shaft $o$ for the feed conveyer $n$ to a chain wheel on a shaft $r'$ on which the pulleys for the adjacent ends of the two discharge conveyers are secured.

The described mechanisms for feeding the cherries and discharging the pits and pitted cherries are efficient and therefore desirable, but other suitable means for performing these functions could be employed with the described pitting mechanism without departing from the spirit of this invention.

When the machine is equipped with cherry holders E constructed as before described, it operates most efficiently if the cherries are substantially uniform in size so that they will seat properly in the holders. The cherries are, therefore, preferably graded and the different grades or sizes pitted separately. The holders E, which are suited to one grade, can be readily adapted for a smaller grade by placing adaptors or conical bushings R in the holders, as indicated in Fig. 20.

In order to obviate the necessity for grading the cherries the machine can, if desired, be equipped with the holders such as shown in Figs. 21 and 22, which are automatically adjustable to fruit of different sizes. This holder E' is provided with radially slidable centering pieces R' having inclined inner ends which normally project into the conical seat of the holder. The centering pieces are pressed yieldingly inward by an elastic band $r^2$ encircling the holder and engaging the outer ends of the centering pieces. These centering pieces will properly center and hold small cherries, and will yield to permit larger cherries to seat properly in the holder with reference to the pitting punch and the stripping disk.

Figs. 26 and 27 show a slightly different construction of adjustable holder having pivoted centering pieces $R^2$ which are pressed inwardly for holding small cherries, by suitable springs $r^3$ and are adapted to yield to accommodate larger cherries.

In Figs. 23-25 is illustrated a pitting punch of modified construction, and actuating mechanism therefor. This punch $B'$ is provided with a center pin S which is movable endwise in a longitudinal central hole in the punch $B'$ and is connected to an actuating rod $s$ extending through a hole in the punch plunger $C'$. The center pin is normally retracted with its end sheathed in the punch by a spring $s'$ surrounding the rod $s$ in the plunger $C'$. The punch $B'$ is reciprocated by a cam $s^2$ on the shaft I engaging the cross head $s^3$ to which a pair of the plungers $C'$ are secured, as in the first construction described, but when the punch has reached the limit of its downward movement and shoved the pit ahead of it, and while it is held stationary by reason of the slight dwells $s^4$ at the ends of the cams $s^2$, the center pin is projected downwardly and forces the pit through the elastic stripping disk. This action of the center pin is produced by a cam or tappet arm T on the cam shaft I which strikes a lug on a lever $t$ that is pivoted on the cross head $s^3$ and engages the upper end of the pin-actuating rod $s$. If this pitting punch $B'$ is employed it is not so essential for the cherries to be placed in the holder E with the stem end downward, since if the cherry lies with its pit horizontal, or other than vertical, so that it cannot pass so readily through the stripping disk, the center pin will descend far enough to positively force it through the stripping disk, and the center pin being slender and centrally located will not cut or injure the stripping disk. This punch is, therefore, well adapted to use in a machine provided with means for automatically feeding the cherries to the cherry holders.

The pits in Maraschino cherries, in the condition in which these cherries are received by the canners or packers, cling to the meat much more tenaciously than the pits in ripe domestic cherries and it is therefore a more difficult problem to properly remove the pits without deformation and waste of the fruit. Since the pitting devices constructed as described operate in an essentially efficient and satisfactory manner for pitting cherries of this kind in which the pits cling to the meats, they are also very well suited to the pitting of other fruit of a more or less analogous nature, such, for example, as olives, and while the machine is described in this specification as especially intended for pitting cherries, it is not thereby intended to limit the invention to machines for pitting cherries only.

It will be noted that the machine described is entirely automatic in operation except that the fruit is placed in the feed hopper and is placed by hand from the corrals into the reciprocating holders.

I claim as my invention:

1. In a fruit pitting machine, the combination of a coöperating pitting punch and a fruit holder, one of which is movable for causing the punch to pierce the fruit in the holder, shove the pit out of the fruit and lift the pitted fruit out of the holder, said holder having a seat in which the fruit rests and a stripping device below the seat through which the pit is shoved by the punch, means for moving said holder from beneath the punch and placing a discharge opening for the pitted fruit in receiving position beneath the punch while the punch is raised, and means for disengaging the pitted fruit from the raised punch whereby the pitted fruit is prevented from falling back into said holder and is caused to fall into the discharge opening.

2. In a fruit pitting machine, the combination of a coöperating pitting punch and a fruit holder, means for reciprocating said punch toward and from said holder for causing the punch to pierce the fruit in the holder, shove the pit out of the fruit and lift the pitted fruit out of the holder, means for reciprocating the holder horizontally to and from operative position beneath said punch, means for disengaging the pitted fruit from said punch, separate conveyers for discharging the pits and pitted fruit from the machine, means for directing the pits to the pit conveyer, and means for receiving and directing the pitted fruit to the fruit conveyer, substantially as set forth.

3. In a fruit pitting machine, the combination of an open-ended holder having a seat for the fruit, a pitting punch, means for reciprocating the punch toward and from said holder for causing the punch to pierce the fruit in the holder, shove the pit out of the fruit and lift the pitted fruit out of the holder, means for reciprocating the holder horizontally to and from operative position beneath said punch, means for disengaging the pitted fruit from said punch, a chute arranged beneath the holder to receive the pits, a chute at one side of the plane of said holder into which the pitted fruit drops from said punch, and separate conveyers to which said chutes deliver the pits and pitted fruit, substantially as set forth.

4. In a fruit pitting machine, the combination of a pitting punch, a pair of holders each having a seat for fruit, means for reciprocating said holders intermittently in opposite directions whereby the holders are alternately placed and held stationary beneath said punch and a holder is exposed alternately at opposite sides of said punch for receiving the fruit, and means for reciprocating said punch toward and from each holder while it is stationary beneath the punch for pitting the fruit in said holder, substantially as set forth.

5. In a fruit pitting machine, the combination of a pair of pitting punches, a pair of holders for each punch, each holder having a seat for fruit, means for moving said holders intermittently in opposite directions whereby the holders for each punch are alternately placed and held stationary beneath said punch and two holders are exposed first at one side and then at the opposite side of said punches for receiving the fruit, and means for reciprocating said punches toward and from each set of holders while they are stationary beneath the punches for pitting the fruit, substantially as set forth.

6. In a fruit pitting machine, the combination of pitting punches arranged at intervals lengthwise along the machine, fruit holders provided with seats for the fruit, means for moving the holders transversely of the machine to and from operative relation to the punches, corrals arranged lengthwise along the machine adjacent to the holders, a feed conveyer which travels lengthwise of the machine adjacent to said corrals, and means for delivering the fruit from said conveyer to said corrals, substantially as set forth.

7. In a fruit pitting machine, the combination of pitting devices arranged at intervals lengthwise along the machine between opposite sides thereof, fruit corrals arranged lengthwise along the machine at opposite sides of the pitting devices, conveyers at opposite sides of the machine which travel lengthwise thereof adjacent to said corrals, and means for delivering the fruit from said conveyers to said corrals, substantially as set forth.

8. In a fruit pitting machine, the combination with a pitting punch, of a fruit holder having an elastic stripping disk with a perforation through which the pit is forced by said punch, and seating means having yielding members for centering fruit of different sizes in the holder relative to the perforation of said stripping disk, substantially as set forth.

9. In a fruit pitting machine, the combination with a pitting punch, of a fruit holder having an elastic stripping disk with a perforation through which the pit is forced by said punch, and centering devices movable toward and from the axis of the holder and providing an adjustable seat for holding fruit of different sizes centrally relative to the perforation of said stripping disk, substantially as set forth.

10. In a fruit pitting machine, the combination with a pitting punch, of a fruit holder having an elastic stripping disk with a perforation through which the pit is forced by said punch, and a centering device composed of a cup adapted to receive the fruit and having jaws independently movable toward and from the center of the cup for centering the fruit relative to the perforation of said disk, and a spring which yieldingly opposes the outward movement of said jaws, substantially as set forth.

11. In a fruit pitting machine, the combination with a pitting punch, of a fruit holder, a perforated elastic stripping disk through which the pit is forced, and a tubular body carrying the said elastic stripping disk and said fruit holder and being removable from the machine with the stripping disk and fruit holder in place thereon, substantially as set forth.

12. In a fruit pitting machine, the combination with a pitting punch, of a fruit holder, a perforated elastic stripping disk through which the pit is forced, and a hollow body carrying the said elastic stripping disk and said fruit holder, each of said parts being separately removable and the whole being removable as a unit from the machine, substantially as set forth.

13. In a fruit pitting machine, the combination of a pitting punch, a fruit holder, an elastic stripping disk having a perforation smaller than the pit through which the pit is forced, said punch having radial wings, and a central movable pin, means for reciprocating said punch to a point adjacent to but not through said stripping disk to pierce the fruit, and means for projecting said central pin beyond the end of the punch for forcing the pit through the stripping disk, substantially as set forth.

14. In a fruit pitting machine, the combination of a pitting punch having radial wings and a central movable pin, a fruit holder, a perforated elastic stripping disk through which the pit is forced, a stripping device sliding on said punch, means for reciprocating said punch including a cam having a part to move the punch to force the pit partially out of the fruit and a slight dwell for holding the punch stationary while the said central pin is moved against the pit, forcing it quickly through the said perforated elastic stripping disk, and means for moving said pin, substantially as set forth.

15. In a fruit pitting machine, the combination of a pitting punch, a fruit holder, means for reciprocating said punch including a cam having a part shaped to move the punch quickly at the time of contact with pit and push said pit out quickly and having a dwell to hold the punch stationary while the fruit holder is moved out of registration with the punch, said dwell being interrupted to cause a quick movement of the punch to positively disengage the pitted fruit therefrom, substantially as set forth.

16. In a fruit pitting machine, the combination of a pitting punch, a stripping device slidable relative to said punch, a fruit holder, means for reciprocating said punch including a cam having a part shaped to move the punch quickly at time of contact with pits and push said pits out quickly, and having a dwell to hold the punch stationary while the fruit holder is moved from beneath the punch, said dwell being interrupted to cause a quick upward movement of the punch relative to said stripping device to positively disengage the pitted fruit from the punch after the fruit holder has been moved from beneath it, substantially as set forth.

Witness my hand this 11th day of February, 1913.

WILLIAM F. MORSE.

Witnesses:
C. W. PARKER,
C. B. HORNBECK.